United States Patent [19]

Boden et al.

[11] 4,080,012

[45] Mar. 21, 1978

[54] BEARINGS

[75] Inventors: Karl Boden, Juelich; Werner Geweke, Reutlingen, both of Germany

[73] Assignee: Padana AG, Zug, Switzerland

[21] Appl. No.: 572,667

[22] Filed: Apr. 29, 1975

[30] Foreign Application Priority Data

Apr. 30, 1974 Germany .............................. 2420825

[51] Int. Cl.² .......................................... F16C 39/00
[52] U.S. Cl. .................................................. 308/10
[58] Field of Search .................... 308/10; 74/5.46, 5.47

[56] References Cited

U.S. PATENT DOCUMENTS

| | | | |
|---|---|---|---|
| 2,436,939 | 3/1948 | Schug | 308/10 |
| 2,856,240 | 10/1958 | Breazeale | 308/10 |
| 3,233,950 | 2/1966 | Baermann | 308/10 |
| 3,243,238 | 3/1966 | Lyman | 308/10 |
| 3,614,181 | 10/1971 | Meeks | 308/10 |
| 3,650,581 | 3/1972 | Boden | 308/10 |
| 3,791,704 | 2/1974 | Perper | 308/10 |
| 3,860,300 | 1/1975 | Lyman | 308/10 |
| 3,877,761 | 4/1975 | Boden | 308/10 |
| 3,888,553 | 6/1975 | Wehde | 308/10 |

FOREIGN PATENT DOCUMENTS

| | | | |
|---|---|---|---|
| 445,995 | 3/1968 | Switzerland | 308/10 |

*Primary Examiner*—R. Skudy
*Attorney, Agent, or Firm*—Harness, Dickey & Pierce

[57] ABSTRACT

A contactless magnetic bearing system comprises a passive axial bearing element which serves to exert axial stabilizing forces on the rotor and at the same time exerts radial destablizing forces thereon, a controlled or active radial bearing element for counteracting these radial destabilizing forces and a passive radial bearing element which supports and journals the rotor at a position axially spaced from the two first-mentioned bearing elements. The axial destabilizing forces produced by the passive radial bearing are counteracted by the much stronger axial forces exerted by the passive axial bearing element.

21 Claims, 5 Drawing Figures

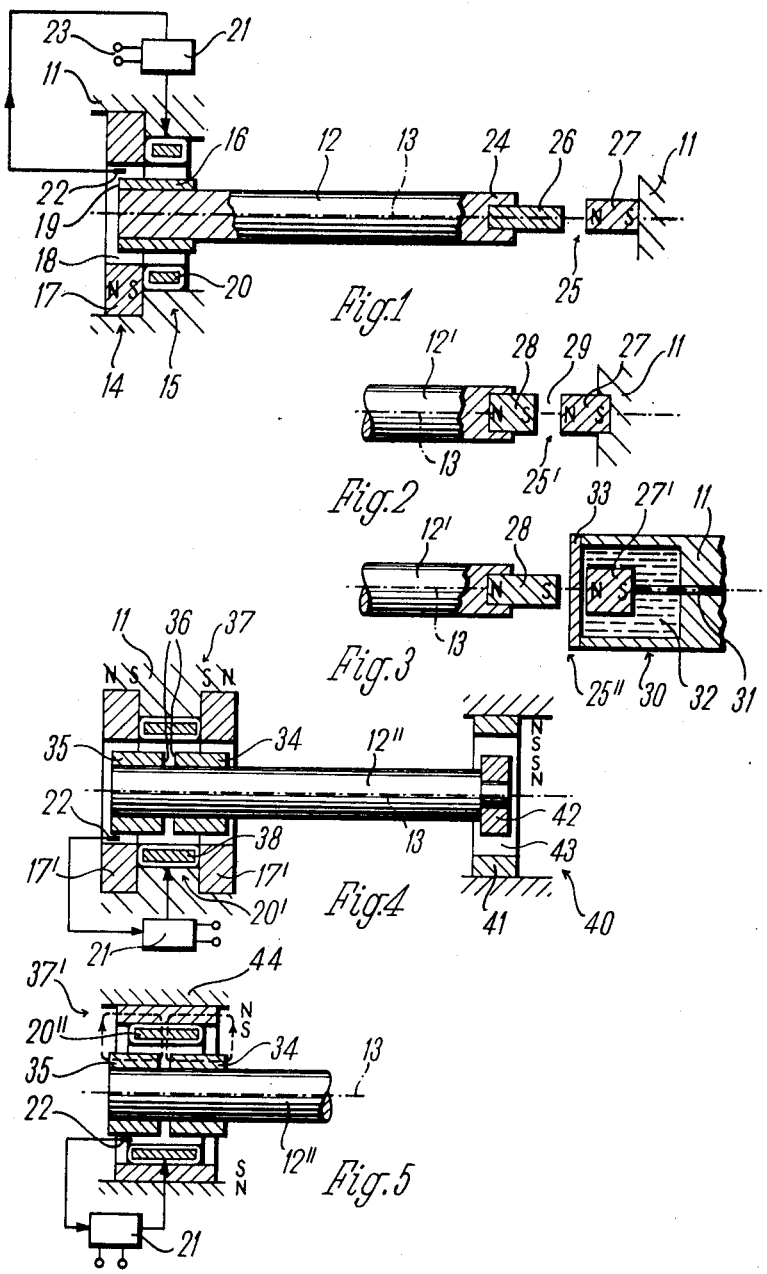

BEARINGS

The invention relates to a magnetic bearing system for journalling a rotor on a stator without contact between the rotor and the stator, and more particularly to a magnetic bearing system having a passive axial bearing element which cooperates with a ferromagnetic portion of the rotor to exert stabilizing axial forces on the rotor, and having an actively controlled, electromagnetic radial bearing element which produces radial restoring forces and opposes destabilizing radial forces exerted on the rotor by the axial bearing element.

A bearing system of this type has been described in the issued U.S. Pat. No. 3,650,581, entitled "Bearing Systems", issued on Mar. 21, 1972 in the names of Karl Boden, et al. In this specification, the passive axial bearing element comprises an annular or bar magnet which axially stabilizes the rotor and whose destabilizing action in a radial direction is countered by an electro-magnetic radial bearing element which operates with contactless displacement pickups or sensors whose signals are applied to an electronic regulator which in turn supplies output currents to a coil combination to produce the stabilizing forces required. In this known bearing system, a second radial bearing to enable the fully contactless journalling of a rotor of any desired shape is also an actively regulated electro-magnetic radial bearing element of the type described above. This bearing system operates extremely satisfactory and, despite improved efficacy and greater operational reliability, is of simpler construction than fully electro-magnetic bearing systems known hitherto. However, it requires for each radial bearing element, that is for at least two bearing planes, an electronic controller which has to supply regulating currents to at least three (usually four) coils or electrical components acting as coils. For specific cases of application, it will be desirable to provide a bearing system in which the number of electronic controllers or components can be reduced and in which, if need be, it is also possible to reduce the power required for the controllers.

Furthermore, in the above-mentioned patent, an embodiment is described in which, for a rotor having a vertical rotary axis, the bottom bearing comprises a permanent magnet which is secured to the rotor and whose magnetic field permeates an electrically conductive body on the stator. The energy of oscillatory movements of the rotor is absorbed by the eddy currents produced in the electrically conductive body, and thus a damping effect is obtained. This bearing element essentially requires a permanet magnet on the rotor and, above all, does not exert any restoring forces on the rotor when in its desired position. Thus, it can be used virtually only for vertically journalled rotors and even then only for such rotors which are not subjected to external forces at least in the region of the bottom bearing and which are not stimulated to effect any large oscillations. In this bearing system, gravity provides the restoring force.

Furthermore, in Swiss Patent No. 445,995 there are described bearing systems in which at least one radial bearing element acts passively, that is without electromagnetic regulation. These bearings are bearings which operate with repulsive magnetic forces and, for this purpose, have a radially polarized annular magnet on the stator and a radially polarized permanent magnet on the rotor. Like poles are located opposite one another at the air gap, so that repulsive forces occur at the air gap. However, a bearing of this type is unstable in an axial direction or produces at the air gap stabilizing forces which upon deflection, seek to force the permanent magnets on the stator and the rotor apart in an axial direction. Therefore, in this known bearing system, the axial position is controlled electromagnetically by means of a controlled electro-magnet acting upon a soft magnetic end disc. A bearing of this type is, in practical operation, highly unsuitable for general application. The drive, eccentricities, swinging and gyroscopic oscillations and other possible external loads cause considerable oscillatory excitation in a radial direction, particularly in the case of relatively rapid rotation for which magnetic bearings are particularly provided. However, the damping behaviour of the rotors journalled in the manner described above is extremely poor, and these rotors are thus intended only for use in electrical measuring instruments, i.e. for low rotor weights and low rotational speeds.

In U.S. Pat. No. 2,856,240 there are described bearing systems which effect radial journalling by means of magnetic shear forces, that is attractive magnetic forces. However, these bearing systems require electro-magnetic regulation in an axial direction.

A feature of the invention is to provide a contactless magnetic bearing system which is distinguished by a low energy requirement, a reduction in the number of electronic components required and, correspondingly, great reliability. A bearing system of this type should be suitable for rotors in all attitudes of their axes, particularly for horizontal bearings.

In accordance with the invention, a magnetic bearing system for journalling a rotor in a stator comprises a passive axial bearing element which cooperates with a ferromagnetic portion of the rotor to exert axial stabilizing forces, an actively controlled, electromagnetic radial bearing element for producing radial restoring forces to oppose destabilizing radial forces excerted on the rotor by the passive axial bearing element, and a passive magnetic radial bearing element which is axially spaced from the active radial bearing element, said passive radial bearing element having at least one permanent magnet which applies radial restoring forces to the rotor, the passive axial bearing element applying to the rotor stabilizing axial forces which are greater than destabilizing axial forces of the passive radial bearing element at least over the operating range of the rotor.

Thus, this means that the axial destabilizing of a non-regulated, i.e. passive, radial bearing is opposed by the stabilizing forces of a non-regulated passive axial bearing. It is known that a permanent magnetic bearing element always acts in a stable manner only in a few degrees of freedom and produces destabilizing forces in a different direction. Furthermore, natural laws render it impossible to provide a fully non-regulated permanent magnetic bearing system. However, the invention provides a contactless overall bearing system which meets the maximum requirements with respect to reliable operation and carrying capacity with a minimum of expenditure on regulation, that is with only one active electromagnetic bearing element. This electromagnetic bearing element, which may be a radial bearing as described in aforementioned patent can as has been shown in practical operation, meet these maximum requirements very satisfactorily with the destabilizing radial forces of the axial bearing. However, the axial bearing passively absorbs the destabilizing axial forces of the passive radial bearing, i.e. without using control energy. This basic principle provides the bearing with its optimum carrying capacity with a minimum of structural expenditure. Furthermore, it has been found that there are also no difficulties in absorbing oscillatory movements in an axial direction. Namely, only one uniaxially oscillating system exists in an axial direction which then also has only one critical oscillation frequency. Also, axial movements are not coupled to the rotation of the rotor about its normal rotary axis, so that, here also, no difficulties occur in an axial direction, in contrast to the considerable influences of rotation caused by the gyroscopic effect in a radial direction. Thus, the eddy current and magnetic reversal losses, which occur during axial movements in the bearings which are in any case provided, are usually adequate for damping axial oscillations.

In accordance with an advantageous feature of the invention, the destabilizing axial force of the passive radial bearing element can oppose the stabilizing axial force of the passive axial bearing element. Thus, since the stabilizing axial force is, as already mentioned, greater than the destabilizing axial force, a stable working point results, although the actual passive axial bearing element can be constructed to act at only one end. In accordance with one embodiment of the invention, the permanent magnet (of which at least one is provided) of the passive radial bearing element can be arranged on the stator to cooperate with a ferromagnetic portion of the rotor. Thus, a bearing element of this type operates with attractive magnetic forces and the radial journalling is effected by so-called "magnetic shear forces". Although the destabilizing forces are relatively great in this instance, and are always effective and have to be compensated for, this is a particularly simple arrangement, since only one stationary permanent magnet is required.

In another embodiment of the invention, the permanent magent (of which at least one is provided) of the passive radial bearing element can also be arranged on the stator to cooperate with a further permament magnet arranged on the rotor. In this embodiment, the magnetic shear forces available are even greater than in the embodiment described previously. However, a permanent magnet is required on the rotor. It may be mentioned at this juncture that the cooperating surfaces of the permanent magnets or end of the rotor can be designed such that the greatest shear forces occur in proportion to the destabilizing forces. A large number of proposals for such design are known for this purpose.

In accordance with a particularly preferred embodiment, the permanent magnet arranged on the rotor can be arranged to engage into the permanent magnet arranged on the stator, and the two permanent magnets, cooperating with one another, can be radially polarized with opposing radial magnetization orientation. Advantageously, the arrangement may be such that the two permanent magnets are concentric annular permanent magnets of sustantially cylindrical configuration. A magnetic bearing element of this type operates with repulsive magnetic forces, since like poles are located opposite one another at the air gap. However, in accordance with its construction, a radial bearing element of this type has a central unstable position of equilibrium in which the destabilizing magnetic forces, becoming effective upon displacement in both axial directions, cancel one another. By appropriate arrangement and construction of the passive axial bearing element, a desired position can be adjusted in which the axial bearing element need not permanently oppose the destabilizing forces of the passive radial bearing element, since the latter runs in the unstable neutral position of equilibrium of forces. The known magnetic radial bearing, described above, has the advantage of better radial bearing properties with a relatively favourable bearing characteristic (characteristic of the ratio of restoring force to deflection). The characteristic curve of the destabilizing forces is also more favourable, since it does not extend progressively to the extent which is usual in the case of bearings operating with attractive forces. In general, it may be said that, in addition to the passive radial bearing elements which are regarded as being particularly advantageous, all other known passive radial bearing elements can be used which fulfil the stated requirements.

Advantageously, a permanent magnet of the passive radial bearing element is arranged on the stator and can be suspended resiliently in a damped manner. Such damping can be effected in many different ways, for example by suspending the permanent magnet from a resilient material having great inherent damping conditioned by material, and by hydraulic damping means etc. The only important thing is that, as described above, the particularly critical radial oscillatory movement, which is stimulated to a great extent during operation, should be damped with the dissipation of oscillation energy. Advantageously, instead of this, or in addition thereto, a non-ferromagnetic electrically conductive member can be arranged in a region of the magnetic field of the permanent magnet or permanent magnets of the passive radial bearing element in which the field strength varies upon displacement of the rotor. Although no losses occur during non-oscillation running owing to the rotationally symmetrical homogeneous magnetic field of these magnets, oscillations of the rotor from the desired position cause eddy current losses in the electrically conductive member, thus leading to dissipation of oscillation energy.

Preferably, the passive axial bearing element and the active radial bearing element form a compact spatial unit and, preferably, can be arranged at one end of the rotor. In the present case, in addition to the confined spatial arrangement which includes the usually permanently magnetized passive axial bearing element and which, in any case, is advantageous for the active radial bearing element, this arrangement has the further advantage that the passive radial bearing element is rendered free from transverse forces which are produced by tilting moments and which might be produced by the active radial bearing element coils during the opposing of the destabilizing forces of the axial bearing element. In this connection, an arrangement is particularly advantageous in which the passive axial bearing element and the active radial bearing element are combined to form a substantially symmetrical unit.

It is particularly important to the satisfactory function of the magnetic bearing system in accordance with the invention that the passive axial bearing element has a satisfactory action and a sufficiently stiff spring characteristic in the working range. Thus, in accordance with a particularly preferred feature of the invention, the ferromagnetic rotor portion, with which the passive axial bearing element cooperates, has in the region of the strongest magnetic flux through the air gap between the rotor and the stator, shoulders which are directed towards one another and which define two ferromagnetic parts which are separated with respect to their effect and each of which has a magnetic flux path flowing therethrough whose components, extending substantially axially in the ferromagnetic portions, are oriented in opposite directions to one another. Thus, there is provided in the ferromagnetic material on the rotor an interstice at the edge region of which the magnetic field passes through the air gap. It has been established that, by this measure, the bearing characteristic can be increased far beyond the arithmetical value. This means that the stabilizing axial force is particularly high in proportion to the expenditure on permanently magnetized material etc. It is also important, particularly in connection with the above-described bearing elements which operate with repulsive magnetic forces, that an axial bearing is provided which is effective in both axial directions, i.e. it can oppose the destabilizing forces of the passive radial bearing element which occur in both directions beyond the unstable point of equilibrium.

The electromagnetic radial bearing element can also be combined with the passive axial bearing element in a particularly advantageous manner if it has at least one coil assembly which receives control currents and which has the magnetic field of the passive axial bearing element passing therethrough. This forms a bias premagnetization which increases the efficacy of the radial bearing coil. Reference may be made to U.S. Pat. No. 3,877,761, entitled "Electromagnetic Bearing Means", issued Apr. 15, 1975 in the name of Karl Boden et al. for details of this effect.

The bearing system described above operates in a particularly advantageous manner if, in accordance with one embodiment of the invention, the passive axial bearing element comprises at least two axially spaced, axially polarized permanent magnets which are magnetized in opposite directions to one another, the shoulders of the ferromagnetic material of the rotor being located in the region of the space between the two permanent magnets. Namely, in this region, the location of like poles opposite one another forms a high concentration of the magnetic flux which can then cooperate in an ideal manner with the shoulders defining the interstice. Advantageously, the coil assembly should also be arranged in this region, since the premagnetization of the coil assembly then profits from the concentration of the flux.

Although the interstice in the ferromagnetic material can, in itself, ensure stable axial journalling, its efficacy is increased if, advantageously, the axial lengths of the ferromagnetic parts are dimensioned such that their ferromagnetically effective ends are located in the region of the magnetic field of the permanent magnets of the passive axial bearing element.

The invention is further described, by way of example, with reference to the accompanying diagrammatic drawings, in which:

In the drawings:

FIG. 1 is a partially sectioned side elevation of a magnetic bearing system in accordance with one embodiment of the invention, FIGS. 2 and 3 are fragmentary sectional views of a passive radial bearing element to illustrate modifications to the bearing system, FIG. 4 is a view, similar to FIG. 1, of a preferred embodiment of a bearing system, and FIG. 5 is a fragmentary sectional view of a combination of an active radial bearing element and a passive axial bearing element to illustrate a further modification to the bearing system.

A contactless magnetic bearing system between a stator 11 and a rotor 12 is illustrated in FIG. 1. In this illustrated embodiment, the rotor 12 is journalled on the stator 11 by means of three bearing elements and is in the form of a bar the bulk of which is made from a non-ferromagnetic material and which can (but need not) rotate about the axis 13.

A passive axial bearing element 14 is arranged in the region of the left-hand end in FIG. 1 and, together with an active electro-magnetic radial bearing element 15, forms an effective bearing unit. These two bearing elements cooperate with a ferromagnetic member 16 in the form of a ring, made from steel or the like, which is slipped onto the rotor.

The passive axial bearing element 14 comprises an axially polarized permanent annular magnet 17 which, in the present case, is arranged around the rotor. Alternatively, however, the axial bearing element 14 could be in the form of a bar magnet and extend into the interior of the end of the rotor. The outer end of the ferromagnetic member 16 is located in the region of the magnetic field of the axial bearing element 14. The magnetic field of the magnet 17 is substantially uniform around the periphery of the air gap 18 between the magnet 17 and the ferromagnetic member 16, so that, upon rotation of the rotor 12 about the axis 13, the ferromagnetic member 16 is not subjected to any reversals of magnetic flux which would lead to losses. However, the passive axial bearing element 14 exerts an axial stabilizing force upon the rotor by virtue of the fact that axial magnetic field components act in the region of the outer end 19 of the ferromagnetic member 16.

The passive axial bearing element 14 exerts relatively strong radial destabilizing forces upon the rotor. These forces balance one another only when the rotor is in its preferred central or axially aligned position, and the slightest radial displacement from this position causes the ferromagnetic member 16 to be pulled further radially towards the annular magnet in the direction of this displacement.

This destabilizing effect in the radial direction is opposed by the active radial bearing element 15. The radial bearing element 15 has a coil assembly 20 which comprises at least three individual coils or windings and which is constructed such that, when the coils are fed with electrical output currents from an electronic controller 21, it can exert attractive forces upon the ferromagnetic member 16 of the rotor in different radial directions. The controller 21 produces its output currents in dependence upon the signals of sensors 22 which are associated preferably with the individual coils and which apply their control signals to the controller 21 in dependence upon their radial distance from the rotor. The controller 21 is connected to a current source 23. The controller applies its output currents to the coil assembly 20 in the form of direct currents whose values vary in accordance with the stabilizing forces to be exerted upon the rotor. Details of this bearing element are described in the aforenoted U.S. Pat. Nos. 3,650,581 and 3,877,761, the contents of which are incorporated herein by reference.

The passive axial bearing element 14 and the active radial bearing element are arranged close together, this having many advantages. In this case, at least a portion of the magnetic field of the annular magnet 17 permeates the bearing coil 20 which will usually be provided with at least one ferromagnetic core. The premagnetization of the bearing coil 20 thus produced substantially increases the efficacy of the active radial bearing element without any change in the losses. Furthermore, by virtue of the small arms of the stabilizing forces of the bearing element 15 relative to the radial destabilizing forces of the bearing element 14, only small tilting moments are exerted upon the rotor when the active radial bearing element 15 opposes the destabilizing forces of the passive axial bearing element 14.

A passive radial bearing element 25 is arranged at the opposite end 24 of the rotor 12, that is the right-hand end as viewed in FIG. 1. In the present case, the radial bearing element 25 comprises a ferromagnetic member 26 which thus does not need to be permanently magnetic. It is arranged rotationally symmetrically of the axis 13 and can comprise, for example, a simple, preferably round steel bar. Alternatively, the member 26 may be formed by any other ferromagnetic end portion of the rotor. An axially magnetized bar magnet 27, located opposite the ferromagnetic member 26, is arranged on the stator so as to be significantly eccentric relative to the axis 13. The bar magnet 27 exerts attracting forces upon the ferromagnetic member 26, and the so-called magnetic shear forces act as radial restoring forces relative to radial displacement of the rotor.

However, the passive radial bearing element 25 acts in an unstable manner in an axial direction. The attractive forces seek to pull the ferromagnetic member 26 towards the permanently magnetized bar magnet 27 and thus form axial destabilizing forces relative to the illustrated desired position of the rotor. These axial destabilizing forces are opposed by the axial bearing element 14. The bearing elements 14 and 25 are dimensioned such that, when in the desired position, and upon any displacement possible duration operation, i.e. when in the operating state, the axial restoring forces of the passive axial bearing element 14 (which act towards the left in FIG. 1) are greater than the destabilizing axial forces of the passive radial bearing element 25 (which seek to pull the rotor towards the right as viewed in FIG. 1.).

Thus, it will be seen that, in this instance, a contactless magnetic bearing system has been provided in which an active radial bearing in only one bearing plane suffices. It is possible to use this simple bearing to journal rotors having a horizontal axis, i.e. with substantial transverse forces (shearing force) acting upon the rotor.

A variant of the passive radial bearing element is illustrated in FIG. 2. Like the bearing illustrated in FIG. 1, the passive radial bearing element 25' has a permanent bar magnet 27 which is fixed to the stator 11 and which is axially polarized and arranged eccentrically with respect to the desired rotary axis 13. An axially polarized permanent bar magnet 28, located opposite the permanent magnet 27, is mounted on the rotor instead of the ferromagnetic member 26. The magnets 27 and 28 are polarized in the same directions, so that unlike poles are located opposite to one another at the air gap 29 between the two magnets. This embodiment functions in exactly the same manner as the embodiment illustrated in FIG. 1, with the exception that the attractive effort, and consequently the magnetic shear forces for radial journalling are greater. It may be mentioned at this juncture that, in accordance with the desired characteristics, the characteristic of the radial forces can be changed and the radial stabilizing action can be increased by choosing a suitable corresponding configuration of the surfaces of the magnets or ferromagnetic members which are adjacent to the air gap 29.

No special means for damping radial oscillations at the passive bearing element 25, 25' are provided in the embodiments shown in FIGS. 1 and 2, i.e. only the eddy current losses due to reversal of the magnetic flux act to damp oscillations. FIG. 3 shows an embodiment which has an oscillation damper 30 on the stator and which is otherwise constructed in the same manner as the embodiment illustrated in FIG. 2, i.e. the passive bearing element 25" has a bar magnet 28 on the rotor 12'. The portion of the passive radial bearing element 25" which is secured to the stator has a permanent bar magnet 27' which is polarized in an axial direction. However, in contrast to the embodiments illustrated in FIGS. 1 and 2, the bar magnet 27' is connected to the stator 11 by way of a resilient rod 31, so that the magnet 27' can, to a certain extent, follow the oscillations of the rotor. The rod 31 can be made from a material having inherent damping such as rubber or a stack of leaf springs, so that it dissipates oscillation energy during the radial deflections induced in the bar by the rotor. It will be appreciated that the radial frequencies of oscillation of the rotor 12' must be taken into account when establishing the resilient suspension of the bar magnet 27'. The bar magnet 27' oscillates in a closed reservoir 32 which is filled with a fluid such as an hydraulic oil. Oscillation energy is also dissipated thereby during movement of the magnet 27'.

A further type of damping is illustrated in FIG. 3. The wall portion 33 of the reservoir 32 which faces the magnet 28 on the rotor comprises a member which is non-ferromagnetic but which has good electric conductivity. Thus, this wall portion 33 is permeated by the magnetic field between the magnets 27' and 28. Local variations in the magnetic field occur in the electrically conductive material 33 upon oscillations in a radial direction or, alternatively, precession or nutation movements of the rotor and lead to eddy current losses. Thus, oscillation energy is dissipated. It may be mentioned that, owing to the preferably accurately rotationally symmetrical distribution of the magnetic field around the axis 13 during non-oscillating running, no local variations in the magnetic field and thus no losses occur. Thus, in the present instance, three types of oscillation damping are used simultaneously. Alternatively, these types of oscillation damping can be used individually or in sub-combinations or in combination with other methods of damping.

In the embodiment illustrated in FIG. 4, the left-hand end of the rotor 12", as viewed in the drawing, has two parts 34, 35 which are made from ferromagnetic material and which are in the form of rings or tubular members and are axially spaced apart on the rotor. Thus, the annular ferromagnetic parts 34, 35 define two shoulders 36 which are directed towards one another and which, in the present embodiment, are formed by the mutually facing end faces of the two parts 34, 35. The distance between the shoulders 36 is less than the radial length of the parts themselves. They can be made from any ferromagnetic material. However, it need not be permanent magnetic material.

A bearing unit 37, which includes the passive axial bearing element and the active radial bearing element, is arranged on the stator 11 in the region of the parts 34, 35. Two axially spaced axially polarized annular permanent magnets 17' are arranged such that they surround the parts 34, 35. A coil assembly 20' which has a ferromagnetic core 38 and which, referring to FIG. 4, is fed with control currents by a controller 21, is located in the space formed between the permanent magnets 17'. The bearing unit 37 is thus of substantially symmetrical construction.

The construction of the coil assembly 20 corresponds to that illustrated in the previously mentioned Published German Patent (Auslegeschrift) No. 2,213,465 and has a winding which is wound toridally around a ferromagnetic annulus and which is subdivided into four regions to enable the individual coils or coil portions to produce differing or oppositely directed magnetic fluxes in the ferromagnetic core. A magnetic field cooperating with the parts 34, 35 is then produced as a result of the flux displacement or distortion.

The annular permanent magnets 17' are polarized in opposite axial directions, i.e. like poles face one another. Thus, a particularly strong field is produced in the region of the coil assembly 20' and cooperates with the shoulders 36 between the parts 34, 35 for the purpose of axially stabilizing the rotor. The axial stabilizing effect is further increased by virtue of the fact that the mutually remote end faces of the parts 34 and 35 are also located in the region of the magnetic field of the magnets 17'. It must be borne in mind that this axial bearing produces forces in both directions, i.e. an axially stable position is provided even without the cooperation of another bearing element or a force acting upon the rotor.

The strong magnetic field in the region between the two annular permanent magnets 17' effects a very high premagnetization of the coil assembly 20' which is thus rendered particularly effective. It may be mentioned that the axial forces, produced with the described bearing, are also greater than one would suppose by comparison with the magnetic axial bearings used hitherto. The shoulders 36 can be manufactured in an optional manner. The only essential thing is that there should be a perceptible interruption in the ferromagnetic action of the rotor at this location. The interstice between the parts 34, 35 should lie as centrally as possible between the magnets 17' when in the neutral or stable state. This bearing element can also be constructed as an internal bearing in a corresponding manner, the rotor which is then necessarily hollow at this location, then rotating around the magnet which, for example, is in the form of a bar magnet.

The passive radial bearing element 40 illustrated in FIG. 4 has an annular permanent magnet 41 which is mounted on the stator and which is polarized in a radial direction. A radially polarized annular magnet 42 is also arranged on the rotor 12" and, in the neutral or stable position, runs concentrically in the annular magnet 40. The two annular magnets are polarized in opposite radial directions, i.e. like poles are located opposite one another at the annular air gap 43 between the magnets. Thus, a repulsive effect is obtained which produces radial restoring forces on the rotor.

However, this passive radial bearing element 40 is unstable in an axial direction, i.e. when in an axial central position, the destabilizing forces acting in both directions balance one another. However, upon the least displacement from this central position in either axial direction, the annular magnet 42 seeks to displace the rotor 12" further in the direction of this displacement. This is opposed in both directions by the passive axial bearing element which is included in the bearing unit 37.

It will be seen that, in this embodiment, it is possible to axially adjust the bearings relative to one another such that the rotor is relieved of axial forces. It may be mentioned that a large number of different types of bearings which operate with attractive or repulsive forces, as well as all combinations thereof, may be used as passive radial bearing elements.

FIG. 5 shows a bearing unit 37' which, in principle, corresponds to the bearing unit 37 shown in FIG. 4. However, in the present instance, the two axially polarized annular permanent magnets 17' are replaced by a single radially polarized annular magnet 44 arranged around the coil assembly 20" which can otherwise correspond to the coil assembly 20'. In this connection, the main portion of the magnetic flux also extends through the coil assembly 20" and provides premagnetization, and, in the same manner as is shown in FIG. 4, two magnetic flux paths are created and occasion oppositely directed fluxes in the ferromagnetic parts 34, 35 of the rotor. This bearing acts like the bearing shown in FIG. 4, i.e. it is a "double-acting" axial bearing and is characterised by high restoring forces in an axial direction, both in the absolute values and relative to the displacement paths.

We claim:

1. In a magnetic bearing system for journalling a rotor on a stator without contact between the rotor and the stator, the combination comprising: a ferromagnetic portion on said rotor, a passive magnetic axial bearing means which cooperates with said ferromagnetic rotor portion to exert axial stabilizing forces and destabilizing radial forces on said rotor, an active controlled, electromagnetic radial bearing means for producing radial restoring forces to oppose said radial destabilizing forces, and a passive magnetic radial bearing means which is axially spaced from said active electromagnetic radial bearing means said passive radial bearing means comprising at least one permanent magnet which applies radial restoring forces and axial destabilizing forces to said rotor, said stabilizing axial forces of the passive axial bearing means being greater than said destabilizing axial forces of the passive radial bearing means in the operating range of the rotor.

2. A magnetic bearing system according to claim 1, in which said destabilizing axial force of the passive radial bearing means opposes said stabilizing axial force of said passive axial bearing means.

3. A magnetic bearing system according to claim 1 in which said passive radial bearing means comprises a ferromagnetic portion on said rotor and at least one permanent magnet arranged on said stator and cooperating with the lastmentioned ferromagnetic portion of the rotor.

4. A magnetic bearing system according to claim 1 in which said passive radial bearing element comprises a permanent magnet on said rotor and at least one permanent magnet arranged on said stator and cooperating with said permanent magnet arranged on the rotor.

5. A magnetic bearing system according to claim 4, in which said two permanent magnets of said passive radial bearing means are arranged one within the other and are radially polarized with like poles facing one another.

6. A magnetic bearing system according to claim 5, in which said two permanent magnets comprise concentric, substantially cylindrical permanent magnets.

7. A magnetic bearing system according to claim 1 further comprising damping means resiliently suspending said permanent magnet of said passive radial bearing means arranged on said stator.

8. A magnetic bearing system according to claim 1 further comprising non-ferromagnetic, electrically conductive means arranged in the region of the magnetic field of the permanent magnet of said passive radial bearing means, in which region such magnetic field varies upon displacement of said rotor.

9. A magnetic bearing system according to claim 1 in which said passive axial bearing means and said active radial bearing means combine to form a compact spatial unit.

10. A magnetic bearing system according to claim 9, in which said passive axial bearing means and said active radial bearing means combine to form a substantially symmetrical unit.

11. A magnetic bearing system according to claim 1 in which said ferromagnetic rotor portion, with which said passive axial bearing means cooperates, defines two mutually facing shoulders in the region of the strongest magnetic flux through the air gap between the rotor and the stator, which shoulders separate such rotor portion into two ferromagnetic parts which are separate with respect to their effect and each of which has a respective magnetic flux path therethrough, said flux paths having respective components extending substantially axially in said ferromagnetic parts and orientated in opposite directions relative to one another.

12. A magnetic bearing system according to claim 11, in which said electromagnetic active radial bearing means includes at least one coil means which is adapted to conduct control currents and which is permeated by the magnetic field of said passive axial bearing means.

13. A magnetic bearing system according to claim 12, in which said passive axial bearing means comprises at least two axially spaced, axially polarized permanent magnets which are polarized in opposite directions relative to one another, and said shoulders of said ferromagnetic parts of the rotor are located in the region of the axial space between said two permanent magnets.

14. A magnetic bearing system according to claim 13, in which said coil means is arranged in said axial space formed between said two permanent magnets of the passive axial bearing means.

15. A magnetic bearing system according to claim 11 in which said ferromagnetic parts further define ferromagnetically effective ends directed mutually away from one another and located in the region of the magnetic field of the permanent magnet of said passive axial bearing means.

16. A magnetic bearing system according to claim 3 in which said permanent magnet of said passive radial bearing means is axially polarized.

17. A magnetic bearing system according to claim 4 in which said two permanent magnets of said passive radial bearing means are axially polarized with unlike poles facing one another.

18. A magnetic bearing system according to claim 5 in which said permanent magnet on said stator comprises a radially polarized annular permanent magnet and said permanent magnet on said rotor is arranged concentrically within said annular permanent magnet.

19. A magnetic bearing system according to claim 1 in which said passive axial bearing means comprises an axially polarized annular permanent magnet arranged alongside said active radial bearing means.

20. A magnetic bearing system according to claim 11 in which said passive axial bearing means comprises a radially polarized permanent magnet arranged concentrically with respect to said active radial bearing means.

21. A magnetic bearing system according to claim 1 in which said passive axial bearing means and said active radial bearing means encircle said ferromagnetic rotor portion.

* * * * *